H. G. REIST.
MEANS FOR VENTILATING DYNAMO ELECTRIC MACHINES.
APPLICATION FILED OCT. 26, 1906.
973,565.
Patented Oct. 25, 1910.
2 SHEETS—SHEET 2.
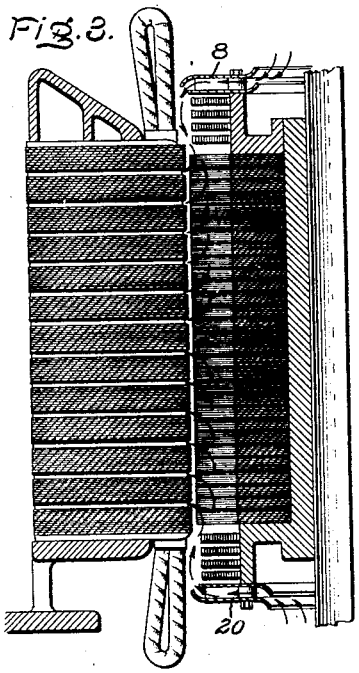
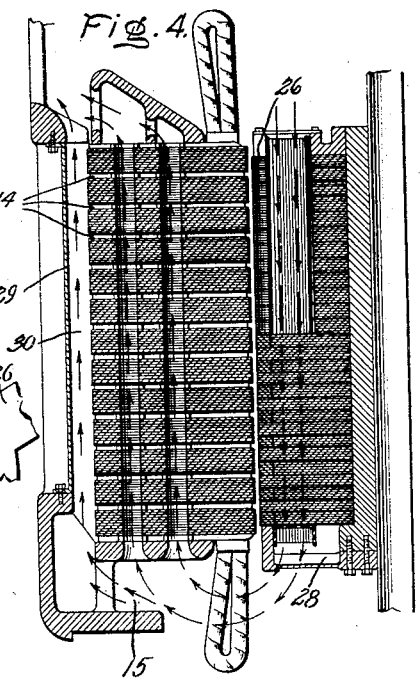
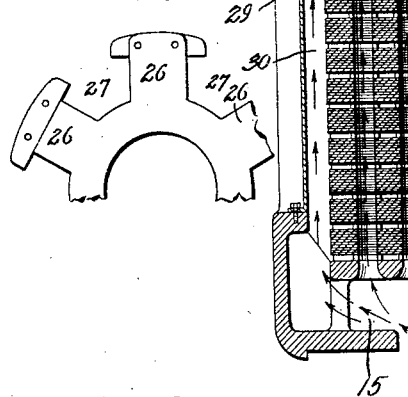
WITNESSES:
INVENTOR:
Henry G. Reist,
By
Att'y.

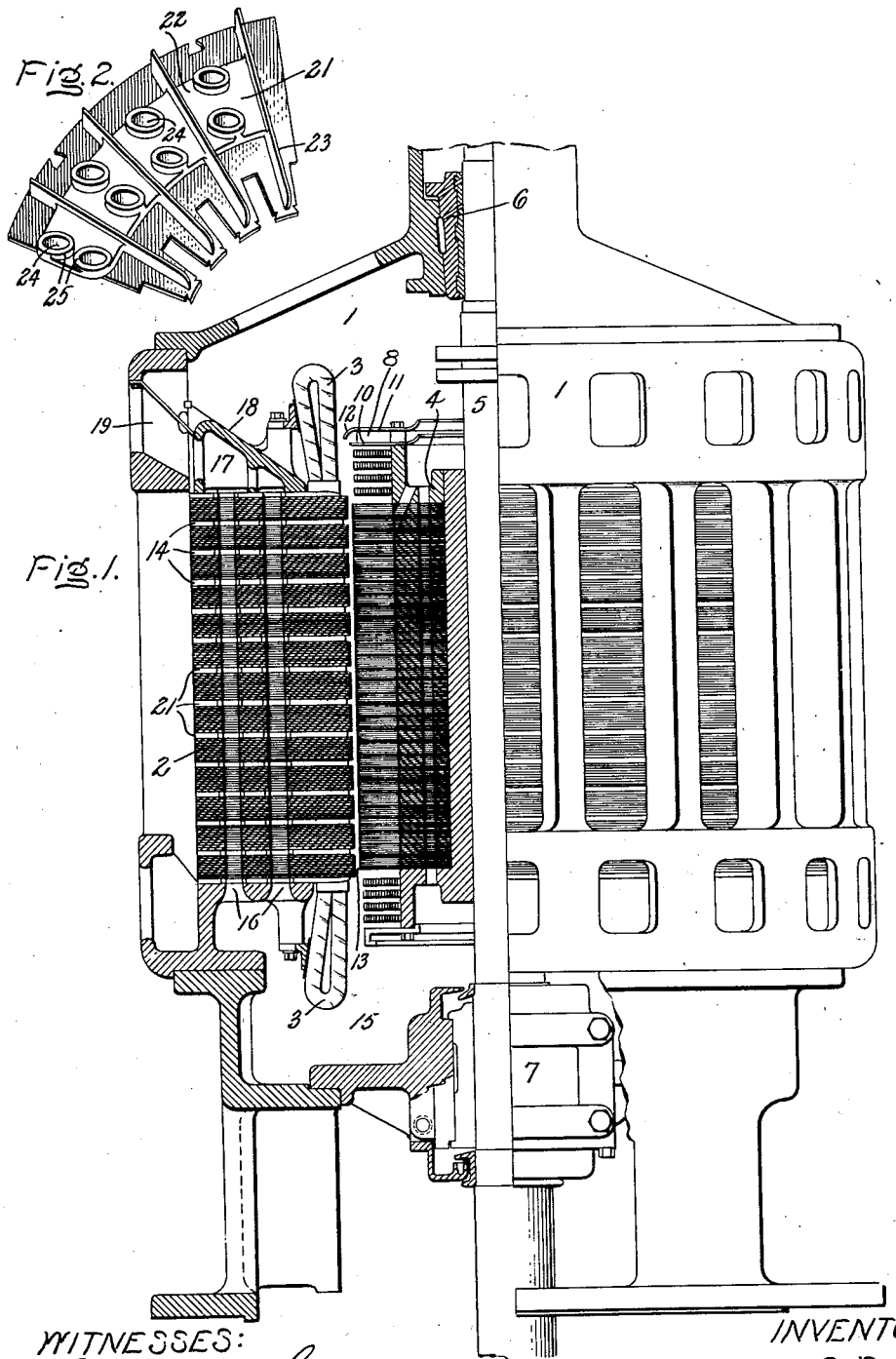

UNITED STATES PATENT OFFICE.

HENRY G. REIST, OF SCHENECTADY, NEW YORK, ASSIGNOR TO GENERAL ELECTRIC COMPANY, A CORPORATION OF NEW YORK.

MEANS FOR VENTILATING DYNAMO-ELECTRIC MACHINES.

973,565.   Specification of Letters Patent.   Patented Oct. 25, 1910.

Application filed October 26, 1906. Serial No. 340,724.

*To all whom it may concern:*

Be it known that I, HENRY G. REIST, a citizen of the United States, residing at Schenectady, county of Schenectady, State of New York, have invented certain new and useful Improvements in Means for Ventilating Dynamo-Electric Machines, of which the following is a specification.

My invention relates to dynamo-electric machines and has for its object to provide improved ventilating arrangements for such machines whereby the heat generated during the operation thereof may be conveniently and effectively carried away and dissipated.

To the above end my invention consists in certain novel features of construction and arrangement of parts to be hereinafter particularly pointed out in the claims.

For a full understanding of my invention and of its various objects and advantages, however, reference may be had to the following detailed description taken in connection with the accompanying drawings, wherein—

Figure 1 shows partly in side elevation and partly in longitudinal cross-section a dynamo-electric machine arranged in accordance with one form of my invention; Fig. 2 is a detail showing a spacing device by which suitable conduits are formed through the core portions of the machine; Fig. 3 is a cross-section of a portion of the machine showing a further modification; Fig. 4 is a view similar to Fig. 3 of another modification; and Fig. 5 is a view showing conventionally the form of the rotor member in Fig. 4.

Reference being had to Fig. 1 of the drawings, 1 indicates the casing of a dynamo-electric machine which in the present instance is illustrated as being of the vertical type. Within this casing is arranged the annular laminated shell 2 which forms the stator core. 3 is one of the stator windings. 4 is a rotor member mounted upon a shaft 5 which is journaled in suitable bearings 6 and 7 so as to support the rotor in operative relation to the stator. All these parts, except as will be hereinafter particularly pointed out, may take any usual or preferred forms.

The machine illustrated is one in which the rotor is of small diameter, thereby making it necessary to make the interior diameter of its core only slightly larger than the shaft upon which it is mounted; no space being left between the rotor core and the shaft through which air may be drawn. It is therefore necessary to provide means for positively forcing the currents of cooling air through the gap between the rotor and the stator, and in addition, where conditions will permit, through longitudinal channels in the body of the rotor core. To accomplish this, I have provided at one end of the rotor a fan 8 having radially-extending vanes. These vanes are preferably placed between an inner plate 10 and an outer plate 11; these plates being in the form of rings whereby a number of radial channels are formed, into the inner ends of which air may be drawn when the rotor is set in motion, which air is expelled through the action of centrifugal force from the outer ends of the channels. The outer end of the plate 11 is curved inwardly, as at 12, so that the air which is expelled radially from the fan is deflected by the part 12 and caused to flow in an axial direction and into the gap 13 between the rotor and stator members. Transverse channels 14 are formed in the stator core and some of the air which is forced through the gap 13 enters these transverse channels and leaves the machine at the outer periphery of the stator. Some of the air from the fan passes through the entire length of the gap 13 and into a closed chamber 15 at the opposite end of the rotor and stator members. From this chamber the air may escape from the machine through longitudinally-extending channels 16 formed in the core of the stator. In order to prevent the air, which after flowing through the gap 13 and channels 16 has, of course, become heated, from being again drawn into the fan member, the upper ends of the channels 16 open into a chamber 17 which may conveniently be formed in the end plate 18 at that end of the rotor, and from this chamber the air is led out of the machine through a passage 19. By this arrangement there is no danger that hot air will be again drawn through the machine. In cases where it is feasible to draw air into the machine from both ends of the rotor, a second fan 20, similar to fan 8, may be arranged at the opposite end of the rotor, as indicated in Fig. 3, in which case the channels 16 in the stator core may be omitted. The arrangement shown in Fig. 1 is, however, particularly applicable to machines in which it is undesirable, for any reason, to draw in air from one end of the machine.

In order that the channels 14 and 16 may be conveniently formed so as to be independent of each other, I prefer to divide the stator core into sections which are separated from each other by spacing devices 21 of the character indicated in Fig. 2. These spacing devices consist of rings 22 made complete, or in sections, depending upon whether the laminæ are made in the form of complete rings or as sections, together with radially-extending ribs 23 connected thereto. The width of the channels 14 is determined by the width of the ribs on the spacing members. The rings 22 are also provided with openings 24 surrounded by continuous walls 25; the openings 24 registering with the perforations in the laminæ and the walls having a depth equal to the width of the ribs, so that when the parts are assembled the channels 16 are separated from the channels 14 by means of the walls 25.

The rotor shown in Fig. 1 is of the smooth core type, but when the rotor is provided with separated poles 26, as in Figs. 4 and 5, the fan may take any form adapted to produce a current of air axially of the machine, since it is unnecessary in this case to force all of the air through the gap between the pole faces of the rotor and the stator, ample ducts 27 being provided between the poles on the rotor. Thus a fan 28 may be arranged at the closed end of the machine, acting to draw the air from the space surrounding the rotor through the fan and into the chamber.

A casing 29 may be placed about the main frame as shown in Fig. 4, whereby a chamber 30 is formed about the outside of the laminated stator core, this chamber communicating with the chamber 15, whereby a flow of air across the outer surface of the core is produced.

It will be evident that my invention may be embodied in other forms than those illustrated, although these latter represent the best forms now known to me.

What I claim as new and desire to secure by Letters Patent of the United States, is,—

1. In a dynamo-electric machine having stator and rotor members, a casing forming a closed chamber at one end of said members, and means for causing air to flow through the machine into said chamber, said stator having channels through the interior thereof leading from said chamber.

2. In a dynamo-electric machine having stator and rotor members, a casing forming a closed chamber at one end of said members, the stator and rotor members being positioned and arranged so as to provide independent channels leading through the machine to and from said chamber, and a fan device for causing air to flow into the chamber through one of said channels and out of the chamber through the other channel.

3. In a dynamo-electric machine having stator and rotor members, a casing forming a closed chamber at one end of said members, and means for producing a flow of air into said chamber through the space surrounding the rotor, said stator having ventilating passages leading from said chamber to points remote from the uninclosed end of the rotor.

4. In a dynamo-electric machine having stator and rotor members, a casing forming an inclosed chamber at one end of said members, and means for forcing air into said chamber through the air gap between said members, one of said members having transverse ventilating channels communicating with said air gap, and the stator member having ventilating channels leading from said chamber to the exterior of the machine.

5. In a dynamo-electric machine having stator and rotor members, a casing forming a closed chamber about one end of said members, said stator having transverse ventilating channels communicating with the air gap between the said members and independent longitudinal channels communicating with said chamber, and a fan device for causing air to flow through the said air gap toward the chamber.

6. In a dynamo-electric machine having stator and rotor members, a casing forming a closed chamber at one end of said members, said stator having transverse ventilating channels communicating with the air gap between said members, and a fan for causing air to flow through said air gap toward the chamber, said stator having also longitudinal ventilating channels communicating with said chamber and with the atmosphere at a point remote from said fan.

7. In a dynamo-electric machine having stator and rotor members, a casing forming a closed chamber at one end of said members, and means for causing air to flow through the air gap between said members into the chamber, said stator having transverse and longitudinal ventilating channels communicating respectively with the said air gap and with the said chamber.

8. In a dynamo-electric machine having stator and rotor members, a casing forming a closed chamber at one end of said members, and means for drawing air into said chamber through the air gap between said members, said stator having transverse ventilating channels communicating with said air gap and independent longitudinal ventilating channels communicating with said chamber, said channels communicating with the atmosphere at points remote from the end of the air gap at which the air enters.

9. In a dynamo-electric machine having stator and rotor members, a casing forming a closed chamber at one end of said members and a fan carried by the rotor at the end opposite said chamber and arranged to force air through the machine and into the chamber, said stator having ventilating channels leading from said chamber to the atmosphere at points remote from said fan.

10. In a dynamo-electric machine having stator and rotor members, a casing forming a closed chamber at one end of said members, and a fan carried by the rotor at the end opposite said chamber and arranged to force air through the machine and into the chamber, said stator having ventilating channels leading from said chamber to the atmosphere at points remote from said fan, and having also transverse channels leading from the air gap between said members, said transverse channels being independent of the other channels.

11. In a dynamo-electric machine having stator and rotor members, a casing forming a closed chamber at one end of said members, said stator having transverse ventilating channels connecting with the air gap between the stator and rotor members and longitudinal ventilating channels through the interior thereof, and a fan device carried on the end of the rotor member in close proximity thereto for causing air to flow through the space surrounding said rotor, through the transverse ventilating channels and also into said chamber and out through said longitudinal channels.

12. In a dynamo-electric machine having stator and rotor members, a casing forming a closed chamber at one end of said members, said stator having transverse ventilating channels connecting with the air gap between the stator and rotor members and longitudinal ventilating channels leading from said chamber, a fan in close proximity to the end of the rotor for producing a current of air transverse to said air gap, and a deflecting device on said fan for directing said current directly into the air gap.

13. In a dynamo-electric machine having stator and rotor members, a casing forming a closed chamber at one end of said members, and a fan carried at one end of said rotor and in close proximity thereto and arranged to force air directly through the space surrounding the rotor, said stator having transverse ventilating channels communicating with said space and longitudinal ventilating channels leading from said chamber.

14. The combination with a core made of perforated laminæ, spacing and ventilating device having spacing ribs and transverse openings, together with raised walls surrounding said openings and having depths equal to the depth of said ribs, said openings registering with the perforations in the laminæ to form ventilating ducts.

15. A core made of perforated laminæ divided into groups and spacing devices between said groups having ribs for separating said groups, and bosses having openings which register with the perforations in the laminæ.

16. A core made of perforated laminæ divided into groups and spacing devices arranged between said groups thereby making transverse and longitudinal spaces in the laminæ, certain of said devices having openings registering with the perforations in the laminæ, said openings being closed against the transverse spaces.

17. The combination with a core made of perforated laminæ, a spacing and ventilating device consisting of a plate having lateral projections some of which are in the form of perforated tubular bosses registering with the perforations in the laminæ to form ventilating ducts.

In witness whereof, I have hereunto set my hand this twenty fifth day of October, 1906.

HENRY G. REIST.

Witnesses:
 EDWARD WILLIAMS, Jr.,
 HELEN ORFORD.